(12) United States Patent
Robertson, Jr. et al.

(10) Patent No.: US 10,908,002 B2
(45) Date of Patent: Feb. 2, 2021

(54) SENSOR AIRFLOW APPARATUS

(71) Applicant: Ford Global Technologies, LLC, Dearborn, MI (US)

(72) Inventors: Michael Robertson, Jr., Livonia, MI (US); Venkatesh Krishnan, Canton, MI (US); Sunil Patil, Troy, MI (US); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/190,807

(22) Filed: Nov. 14, 2018

(65) Prior Publication Data
US 2020/0149933 A1 May 14, 2020

(51) Int. Cl.
*G01D 11/00* (2006.01)
*G01D 11/24* (2006.01)

(52) U.S. Cl.
CPC ................... *G01D 11/245* (2013.01)

(58) Field of Classification Search
CPC .............................. G01D 11/24; G01D 11/245
USPC .......................................................... 73/431
See application file for complete search history.

(56) References Cited

U.S. PATENT DOCUMENTS

| | | | | | |
|---|---|---|---|---|---|
| 3,349,679 | A | * | 10/1967 | Lohman III | G03B 15/00 396/427 |
| 4,815,757 | A | * | 3/1989 | Hamilton | B60R 11/04 182/69.4 |
| 5,406,324 | A | * | 4/1995 | Roth | H04N 7/185 348/143 |
| 7,138,640 | B1 | * | 11/2006 | Delgado | G01N 21/15 250/372 |
| 7,697,028 | B1 | * | 4/2010 | Johnson | B60R 1/00 348/113 |
| 7,810,511 | B2 | * | 10/2010 | Fagrenius | H04N 5/2171 134/44 |
| 9,083,864 | B2 | * | 7/2015 | Reed | G03B 17/02 |
| 9,217,864 | B2 | | 12/2015 | Bell et al. | |
| 9,625,714 | B2 | | 4/2017 | Rousseau | |
| 9,746,666 | B2 | | 8/2017 | Eineren et al. | |
| 10,099,630 | B1 | * | 10/2018 | Krishnan | E05F 15/443 |
| 10,166,949 | B1 | * | 1/2019 | Selim | B60R 25/102 |
| 10,430,833 | B2 | * | 10/2019 | Newman | B60W 50/0098 |
| 10,514,303 | B2 | * | 12/2019 | Krishnan | G01K 1/08 |
| 10,589,723 | B1 | * | 3/2020 | Dubey | B60S 1/0844 |
| 10,597,002 | B1 | * | 3/2020 | Baldovino | B60S 1/0833 |
| 2002/0113875 | A1 | * | 8/2002 | Mazzilli | G07C 5/0891 348/148 |
| 2012/0162428 | A1 | * | 6/2012 | Wee | B60R 11/04 348/148 |

(Continued)

FOREIGN PATENT DOCUMENTS

DE 102013012522 A1 1/2015
WO 2017137277 A1 8/2017

*Primary Examiner* — Jamel E Williams
(74) *Attorney, Agent, or Firm* — Frank A. MacKenzie; Bejin Bieneman PLC (57) ABSTRACT

An apparatus includes a housing defining a chamber and including a panel including an aperture, a sensor fixed inside the chamber and having a field of view through a lens and the aperture, and an annular disc attached to the sensor concentrically around the lens and including a radially outer edge contactlessly exposed to the chamber. An annular slot is defined by the disc. The slot extends at least 180° around the lens.

20 Claims, 13 Drawing Sheets

(56) References Cited

U.S. PATENT DOCUMENTS

| | | | |
|---|---|---|---|
| 2017/0259789 A1* | 9/2017 | McAndrew | B60S 1/56 |
| 2018/0015908 A1 | 7/2018 | Rice | |
| 2019/0310470 A1* | 10/2019 | Weindorf | B60R 11/04 |
| 2020/0101905 A1* | 4/2020 | Taylor | B60R 11/04 |

* cited by examiner

SENSOR AIRFLOW APPARATUS

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

An apparatus includes a housing defining a chamber and including a panel including an aperture, a sensor fixed inside the chamber and having a field of view through a lens and the aperture, and an annular disc attached to the sensor concentrically around the lens and including a radially outer edge contactlessly exposed to the chamber. An annular slot is defined by the disc, and the slot extends at least 180° around the lens.

The slot may extend at least 270° around the lens. The slot may extend 360° around the lens.

The disc may include a projection contacting the panel. The slot and the projection may collectively extend 360° around the lens.

The projection may be shaped to block airflow from the chamber through the aperture other than through the slot.

The disc may include a radially inner surface at which the disc is attached to the sensor. The disc may include a front surface extending along the slot and facing toward the panel, and the front surface may slope away from the panel from the radially inner surface to the radially outer edge.

The disc may include a back surface facing away from the panel and extending from the radially inner surface to the radially outer edge, and the back surface may be contactlessly exposed to the chamber.

The apparatus may further include a pressure source positioned to raise a pressure of the chamber above an atmospheric pressure. The pressure source may be a blower.

The disc may be shaped to guide airflow from the chamber into an air curtain across the lens.

The lens may be convex.

The aperture may be circular.

The panel may have a cylindrical shape.

The sensor may be a first sensor, and the apparatus may further include a second sensor fixed inside the chamber. The aperture may be a first aperture, the lens may be a first lens, the panel may include a second aperture, and the second sensor may include a second lens defining a field of view oriented through the second aperture. The disc may be a first disc, the slot may be a first slot, the radially outer edge may be a first radially outer edge, and the apparatus may further include an annular second disc attached to the second sensor concentrically around the second lens and including a second radially outer edge exposed to the chamber, and an annular second slot may be defined by the second disc and the panel extending at least 180° around the lens.

An apparatus 32 for a vehicle 30 includes a housing 34 defining a first chamber 36 and including a panel 38 including at least one aperture 40, at least one sensor 42 fixed inside the first chamber 36 and having a field of view through a lens 44 and the aperture 40, and an annular disc 46 attached to the sensor 42 concentrically around the lens 44 and including a radially outer edge 48 contactlessly exposed to the first chamber 36. An annular slot 50 is defined by the disc 46. The slot 50 extends at least 180° around the lens 44.

The apparatus 32 provides an air curtain across the lens 44 of the sensor 42, i.e., a thin layer of moving air covering substantially an entirety of the lens 44. The air curtain can prevent debris from contacting the lens 44 and can remove debris from the lens 44. The air curtain can be provided across an entirety of the lens 44 without dead zones. The air curtain can shield the sensor 42 from wind from the ambient environment, and the apparatus 32 can thereby reduce vibration experienced by the sensor 42. The apparatus 32 can efficiently provide these benefits with a small number of parts and with a small packaging space. The apparatus 32 keeps components other than the lens 44 concealed behind the panel 38, providing an aesthetically pleasing, sleek design as seen from an outside observer and protecting the components from the ambient environment.

Figure 1:
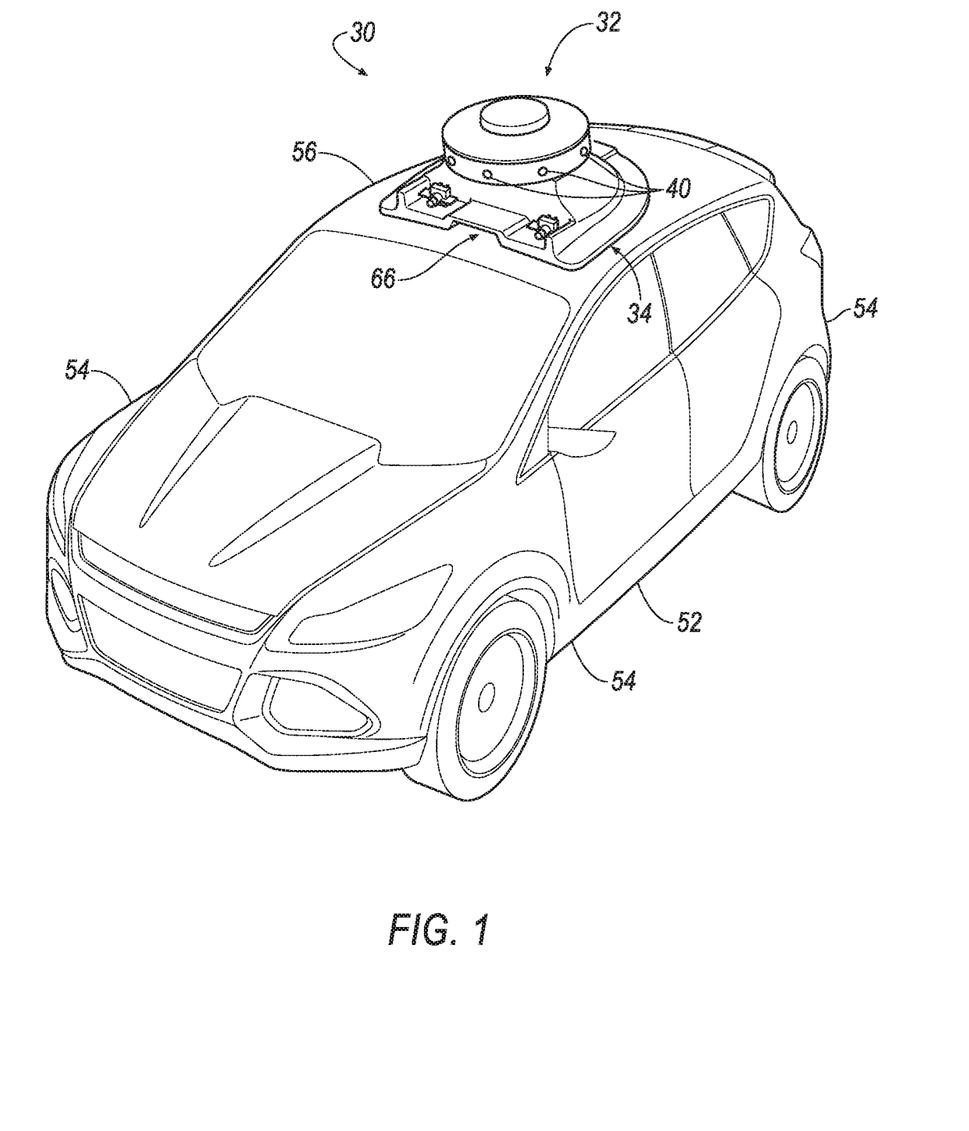
FIG. 1 is a perspective view of an example vehicle.

With reference to FIG. 1, the vehicle 30 may be any passenger or commercial automobile such as a car, a truck, a sport utility vehicle, a crossover vehicle, a van, a minivan, a taxi, a bus, etc.

The vehicle 30 may be an autonomous vehicle. A computer can be programmed to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering. The computer may rely on data from the sensors 42 to autonomously or semi-autonomously operate the vehicle 30.

The vehicle 30 includes a body 52. The vehicle 30 may be of a unibody construction, in which a frame and the body 52 of the vehicle 30 are a single component. The vehicle 30 may, alternatively, be of a body-on-frame construction, in which the frame supports the body 52 that is a separate component from the frame. The frame and the body 52 may be formed of any suitable material, for example, steel, aluminum, etc. The body 52 includes body panels 54, 56 partially defining an exterior of the vehicle 30. The body panels 54, 56 may present a class-A surface, e.g., a finished surface exposed to view by a customer and free of unaesthetic blemishes and defects. The body panels 54, 56 include, e.g., a roof 56, etc.

Figure 2:
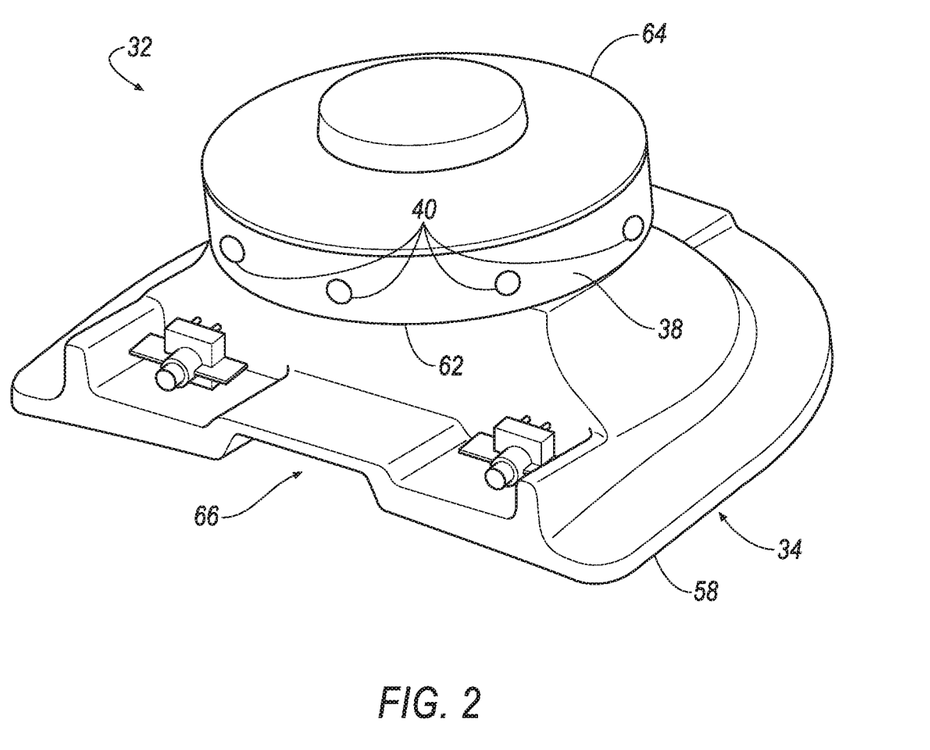
FIG. 2 is a perspective view of an example housing on the vehicle.

With reference to FIGS. 1 and 2, the housing 34 for the sensors 42 is attachable to the vehicle 30, e.g., to one of the body panels 54, 56 of the vehicle 30, e.g., the roof 56. For example, the housing 34 may be shaped to be attachable to the roof 56, e.g., may have a shape matching or following a contour of the roof 56. The housing 34 may be attached to the roof 56, which can provide the sensors 42 with an unobstructed field of view of an area around the vehicle 30. The housing 34 may be formed of, e.g., plastic or metal.

Figure 3:
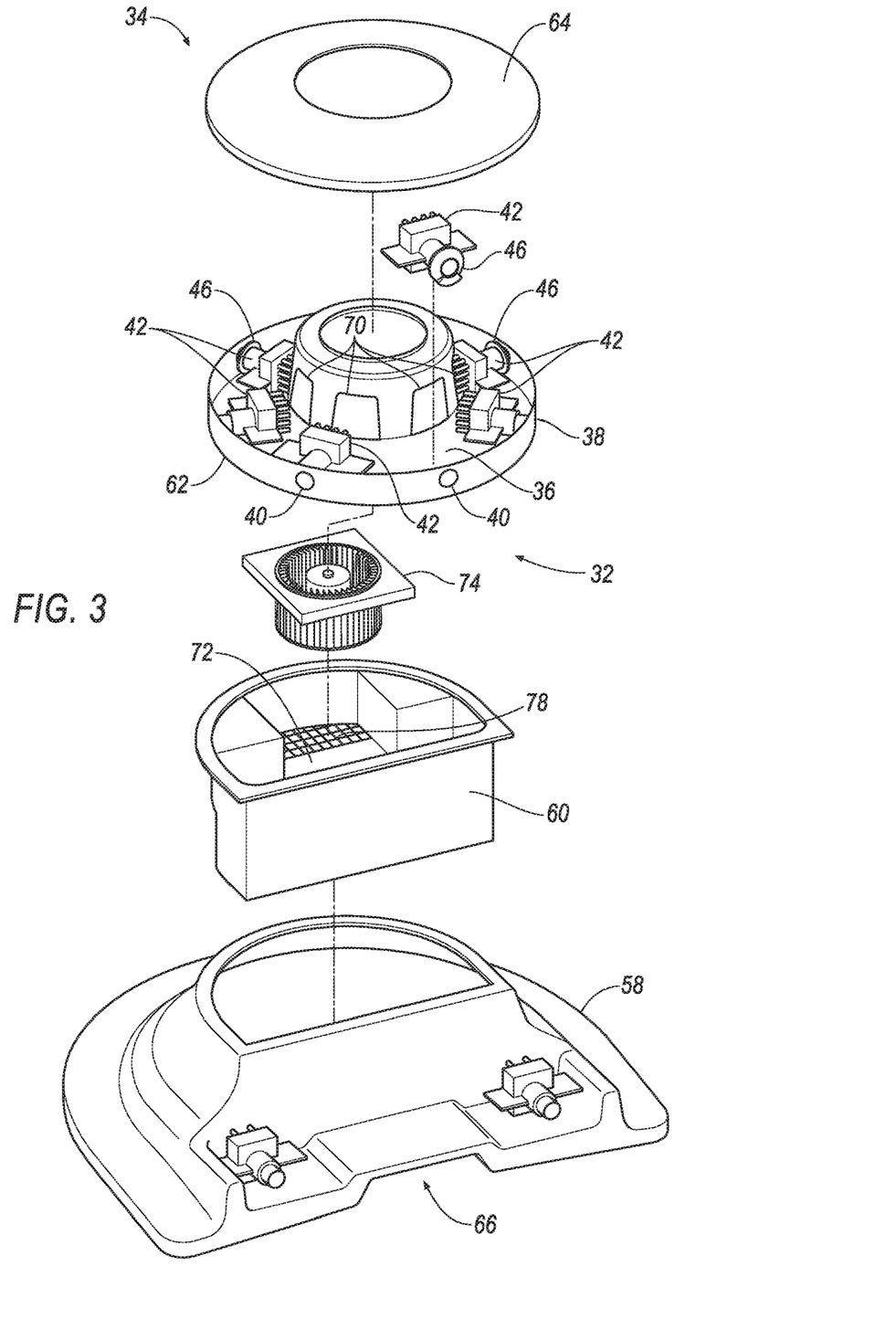
FIG. 3 is an exploded view the housing.

With reference to FIG. 3, the housing 34 includes a base 58, a bucket 60, a tray 62, and a top cover 64. The base 58 is attached to the roof 56 and includes an intake opening 66. The intake opening 66 is positioned to face forward when the housing 34 is mounted on the vehicle 30. The base 58 has a bottom surface shaped to conform to the roof 56 of the vehicle 30 and a top surface with an opening shaped to receive the bucket 60.

The bucket 60 sits in the base 58. The bucket 60 is a container with an open top, i.e., a tubular shape with a closed bottom and an open top. The bucket 60 includes a lip at the top shaped to catch on the top of the base 58. The bucket 60 has a substantially constant cross-section along a vertical axis between the top and the bottom.

The tray 62 sits on top of the base 58 and the bucket 60. The sensors 42 are disposed in the tray 62. The tray 62 includes the panel 38, which serves as a circumferential outer wall, and the tray 62 includes a circumferential inner wall 68. The panel 38 and the inner wall 68 each has a cylindrical shape. The tray 62 includes a floor extending radially outward from the inner wall 68 to the panel 38. The apertures 40 are in the panel 38. The inner wall 68 includes tray openings 70 positioned radially inwardly from respective sensors 42 relative to the tray 62.

The top cover 64 is attached to the tray 62 and encloses the tray 62 from the inner wall 68 to the panel 38. The tray 62 includes a hole sized to receive the inner wall 68 of the tray 62. The top cover 64 extends radially outward relative to the tray 62 from the inner wall 68 to the panel 38. The tray 62 and the top cover 64 together form a toroidal shape.

Figure 4:
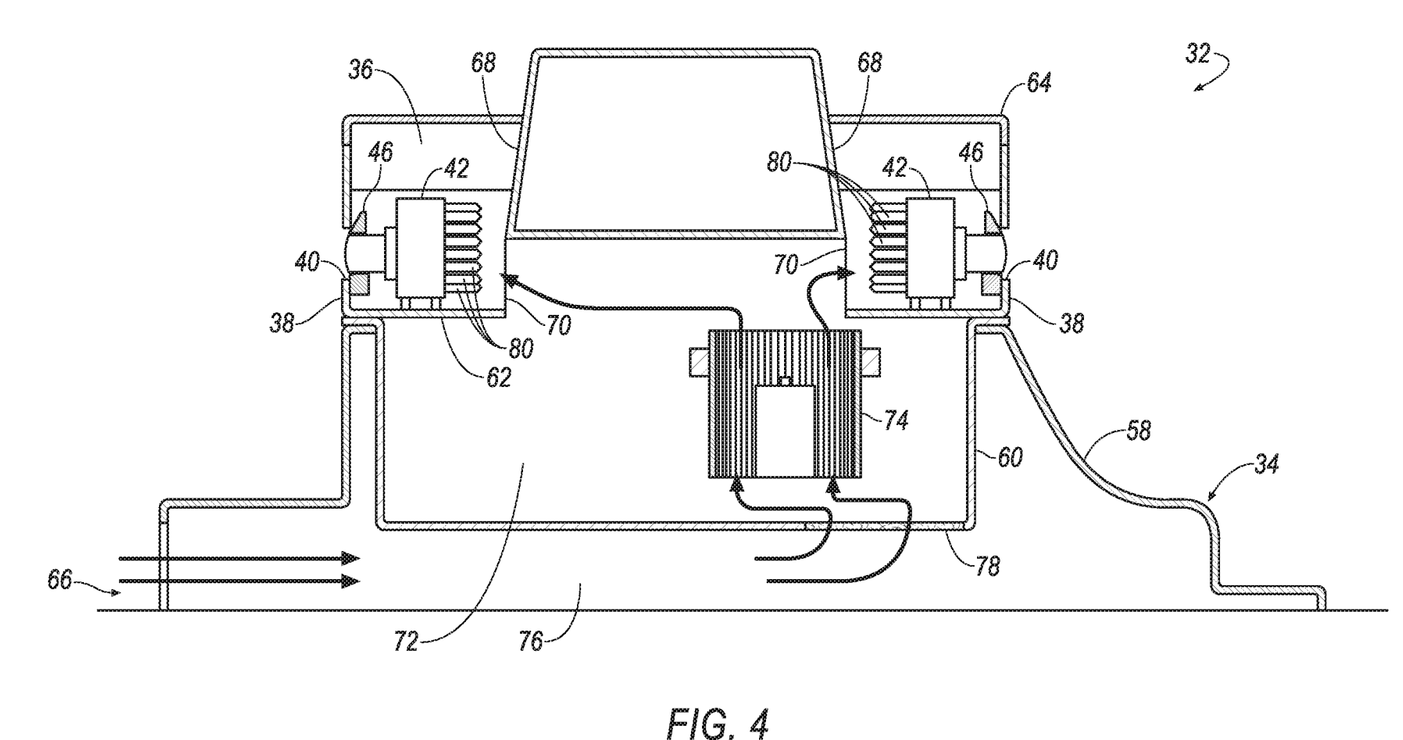
FIG. 4 is a side cross-sectional view of the housing.

With reference to FIG. 4, the housing 34 defines the first chamber 36 in which the sensors 42 are disposed, and the housing 34 defines a second chamber 72 in which a pressure source 74 is disposed. The first chamber 36 may be disposed above the second chamber 72. For example, the tray 62 and the top cover 64 enclose and constitute the first chamber 36. For example, the base 58 and the bucket 60 enclose and constitute the second chamber 72, as shown in FIG. 4. Alternatively, one or more of the body panels 54, 56, e.g., the roof 56, may partially enclose and constitute the second chamber 72 along with the base 58 and/or bucket 60.

The pressure source 74 increases the pressure of a gas occupying the first chamber 36. For example, the pressure source 74 may be a blower, which may reduce a volume of the gas or force additional gas into a constant volume. The pressure source 74 may be any suitable type of blower, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type.

The pressure source 74 is positioned to raise a pressure of the first chamber 36 above an atmospheric pressure. For example, the pressure source 74 is positioned to draw air from an ambient environment outside the housing 34 and to blow the air into the first chamber 36. The pressure source 74 is disposed in the second chamber 72 outside the first chamber 36, e.g., attached to the bucket 60 inside the bucket 60. For example, air enters through the intake opening 66, travels through a passageway 76 below the second chamber 72, travels through a filter 78 leading through a bottom of the bucket 60, and then travels to the pressure source 74. The filter 78 removes solid particulates such as dust, pollen, mold, dust, and bacteria from air flowing through the filter 78. The filter 78 may be any suitable type of filter, e.g., paper, foam, cotton, stainless steel, oil bath, etc. The pressure source 74 blows the air into the second chamber 72, and the air travels through the tray openings 70 into the first chamber 36.

Alternatively to the pressure source 74 being a blower, the apparatus 32 may pressurize the first chamber 36 of the housing 34 in other ways. For example, forward motion of the vehicle 30 may force air through passageways leading to the first chamber 36.

The housing 34 includes the apertures 40. The apertures 40 are holes in the housing 34 leading from the first chamber 36 to the ambient environment. The apertures 40 are through the panel 38 of the tray 62. The apertures 40 are circular in shape. The housing 34 includes one aperture 40 for each of the sensors 42. Each sensor 42 has a field of view received through the respective aperture 40. The sensors 42 may extend into the respective apertures 40. For example, the aperture 40 may be concentric about a portion of the sensor 42, e.g., the lens 44.

Figure 5:
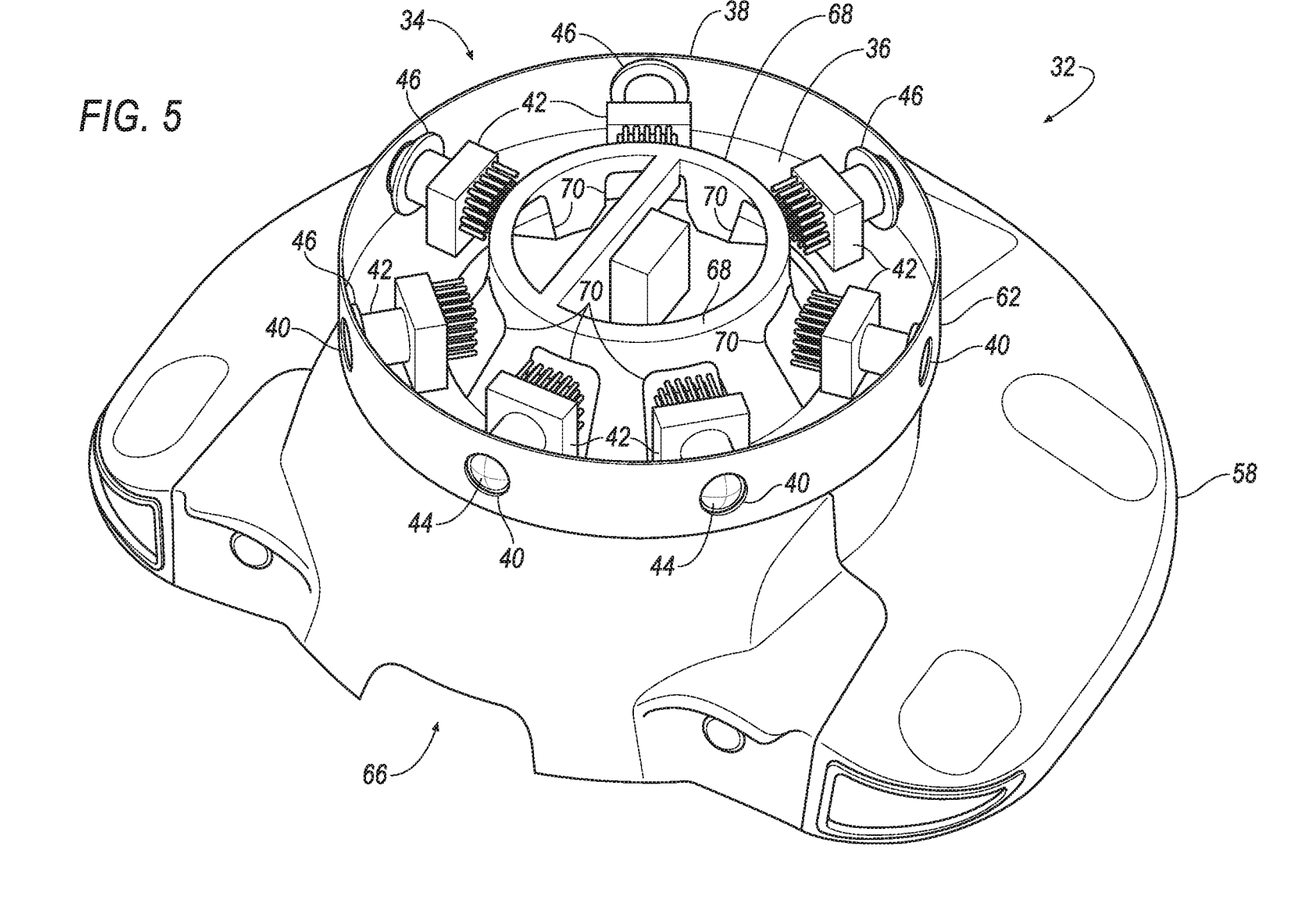
FIG. 5 is a perspective view of the housing with a chamber exposed for illustration.

With reference to FIG. 5, the sensors 42 may detect the location and/or orientation of the vehicle 30. For example, the sensors 42 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 42 may detect the external world, e.g., objects and/or characteristics of surroundings of the vehicle 30, such as other vehicles, road lane markings, traffic lights and/or signs, pedestrians, etc. For example, the sensors 42 may include radar sensors, scanning laser range finders, light detection and ranging (LIDAR) devices, and image processing sensors such as cameras.

Figure 6:
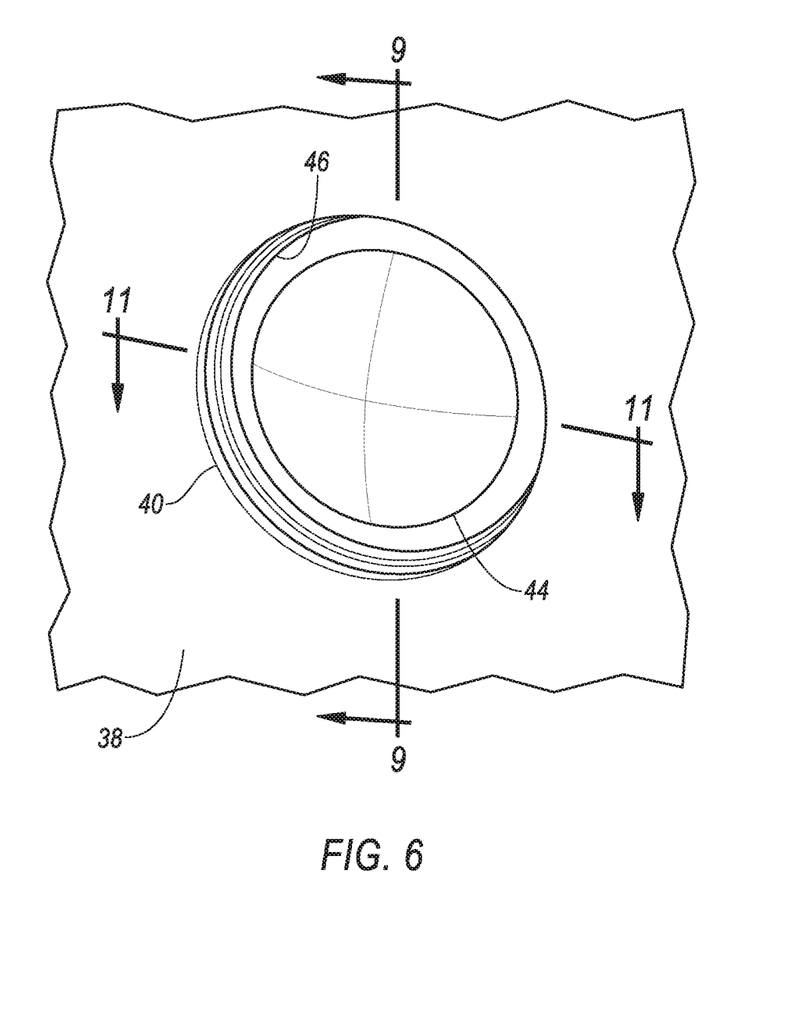
FIG. 6 is a perspective view of a portion of the housing.

In particular, with reference to FIGS. 5 and 6, the sensors 42 disposed in the housing 34 may be one or more cameras arranged to collectively cover a 360° field of view with respect to a horizontal plane. The sensors 42 are fixed inside the chamber. The sensors 42 are fixedly attached directly or indirectly to the housing 34. Each sensor 42 has a field of view through the respective lens 44 and the respective aperture 40, and the field of view of one of the sensors 42 may overlap the fields of view of the sensors 42 that are circumferentially adjacent to one another, i.e., that are immediately next to each other. The lenses 44 may be convex.

Figure 7:
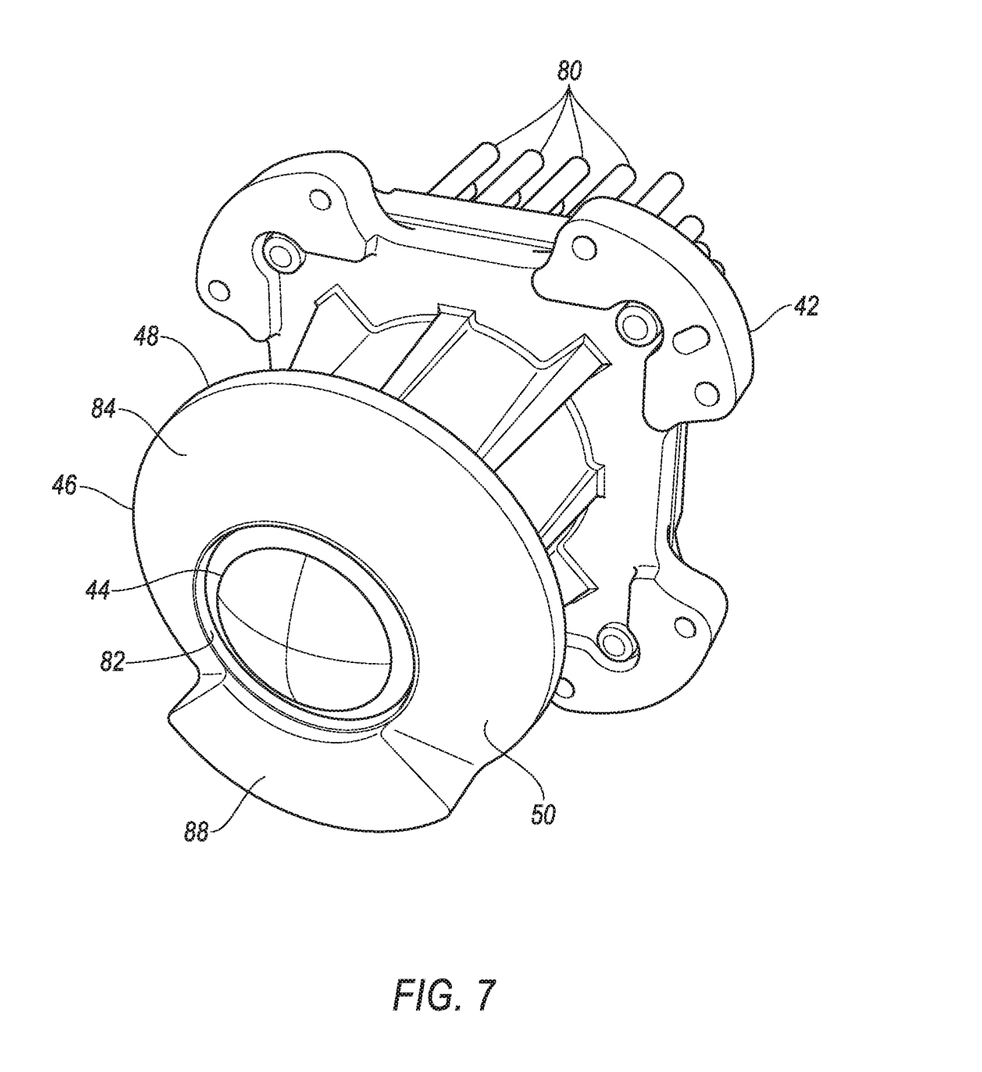
FIG. 7 is a perspective view of an example sensor and disc.

With reference to FIG. 7, each sensor 42 includes a plurality of fins 80. The fins 80 are thermally conductive, i.e., have a high thermal conductivity, e.g., a thermal conductivity equal to at least 15 watts per meter-Kelvin (W/(m K)), e.g., greater than 100 W/(m K), at 25° C. For example, the fins 80 may be aluminum. The fins 80 are shaped to have a high ratio of surface area to volume, e.g., long, thin poles or plates.

Each disc 46 is attached to one of the sensors 42 concentrically around the lens 44 of that sensor 42. The disc 46 may be attached in any suitable manner, e.g., adhesive, interference fit, etc.

Figure 8:
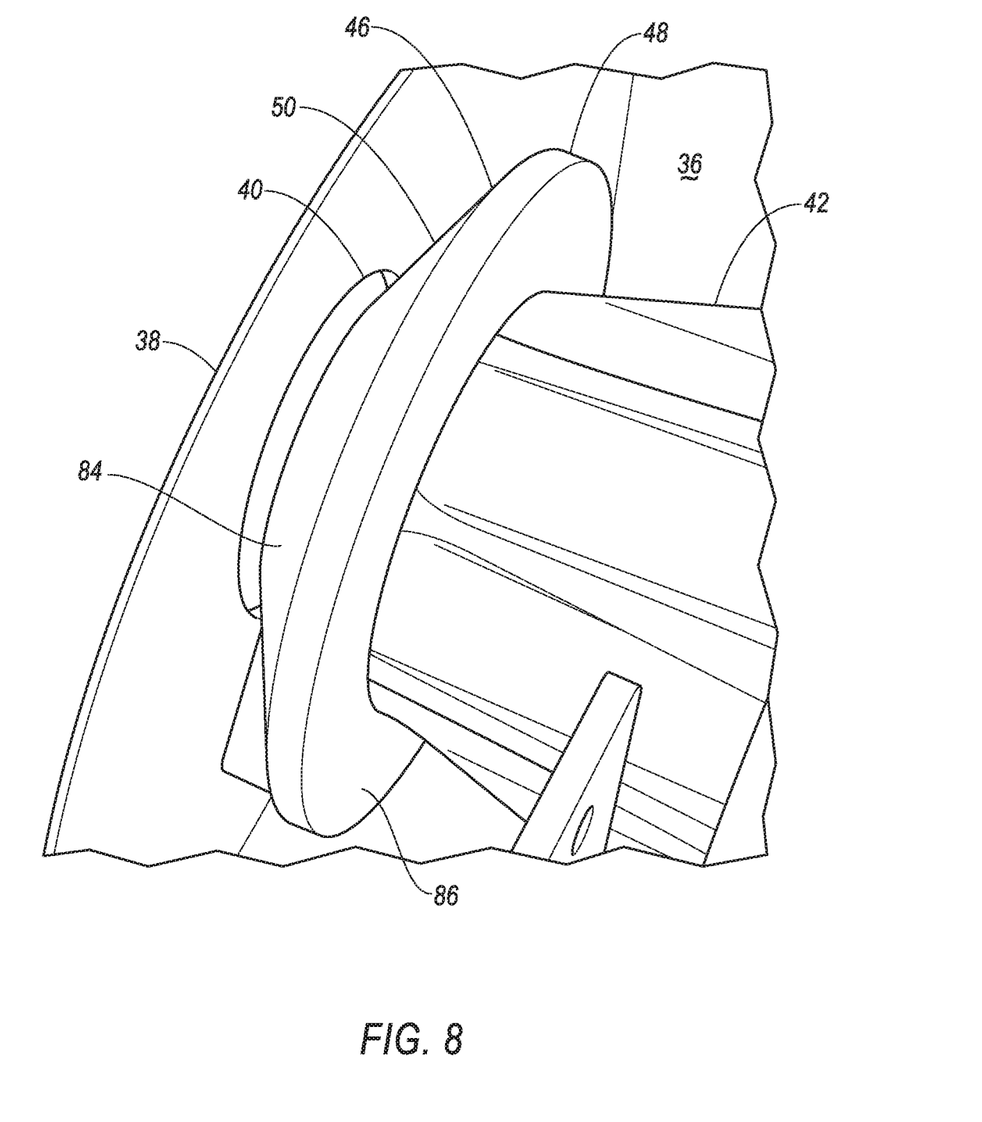
FIG. 8 is a perspective view of the sensor and disc inside the housing.
Figure 9:
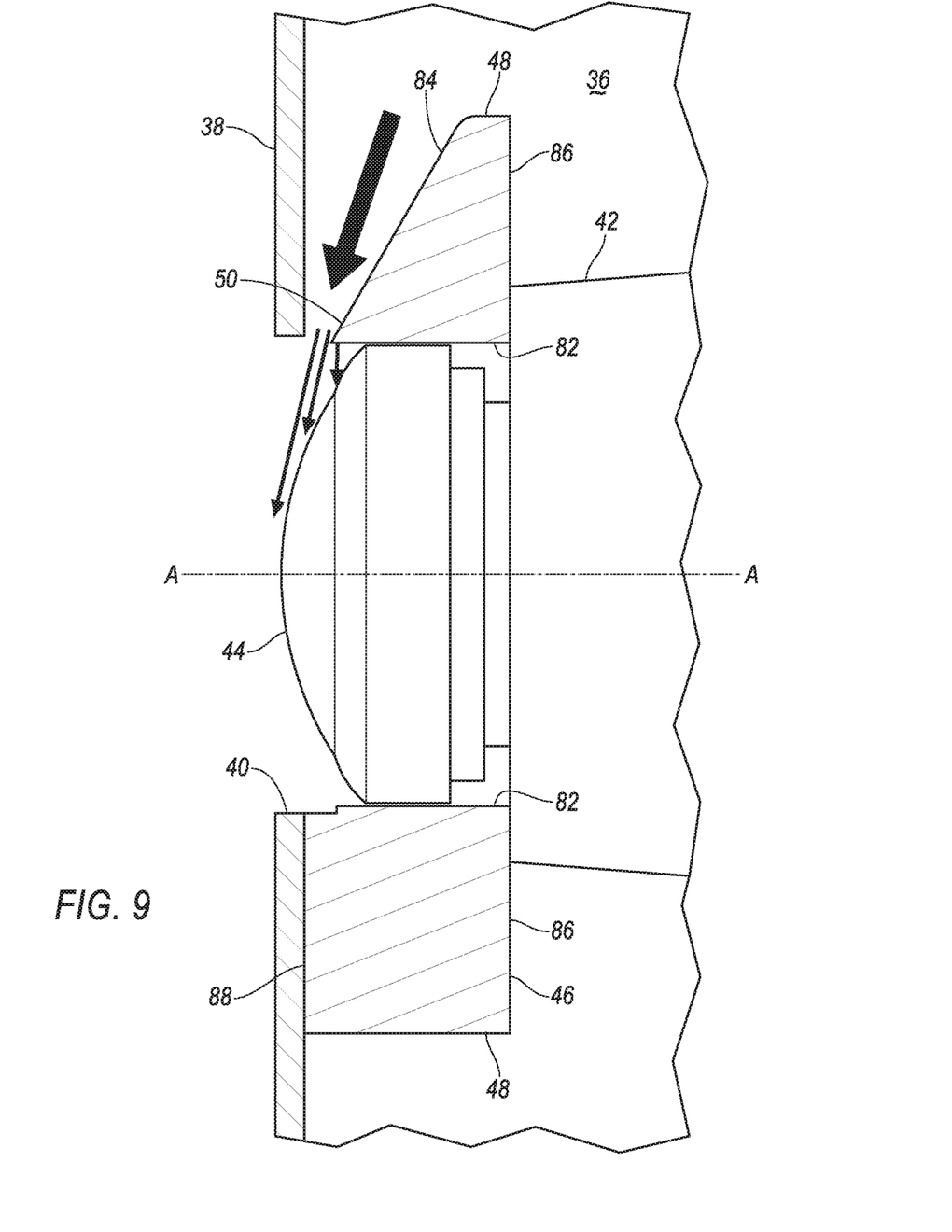
FIG. 9 is a cross-sectional side view of the sensor, the disc, and the housing.

With reference to FIGS. 8 and 9, each disc 46 may have a toroidal shape defining an axis A (illustrated in FIG. 9). The axis A passes through a center of the respective lens 44. The disc 46 includes the radially outer edge 48, a radially inner surface 82, a front surface 84, and a back surface 86. The radially inner surface 82 extends circumferentially around the axis A and faces radially inwardly toward the axis A. The radially inner surface 82 is closer to the axis A than the radially outer edge 48. The disc 46 is attached to the sensor 42 at the radially inner surface 82. The radially outer edge 48 extends circumferentially around the axis A and is farther from the axis A than the rest of the disc 46. The radially outer edge 48 is disposed in the first chamber 36 and spaced from the housing 34. The radially outer edge 48 is contactlessly exposed to the first chamber 36. For the purposes of this disclosure, "A is exposed to B" means that a surface A is disposed within a volume defined and enclosed by a structure B without intermediate components shielding the surface A from the structure B. For the purposes of this disclosure, "contactlessly" means without touching a solid object. The back surface 86 faces away from the panel 38. The back surface 86 extends circumferentially around the axis A and extends from the radially inner surface 82 to the radially outer edge 48. The back surface 86 may be flat. The back surface 86 is disposed in the first chamber 36 and spaced from the housing 34. The back surface 86 is contactlessly exposed to the first chamber 36.

Figure 10A:
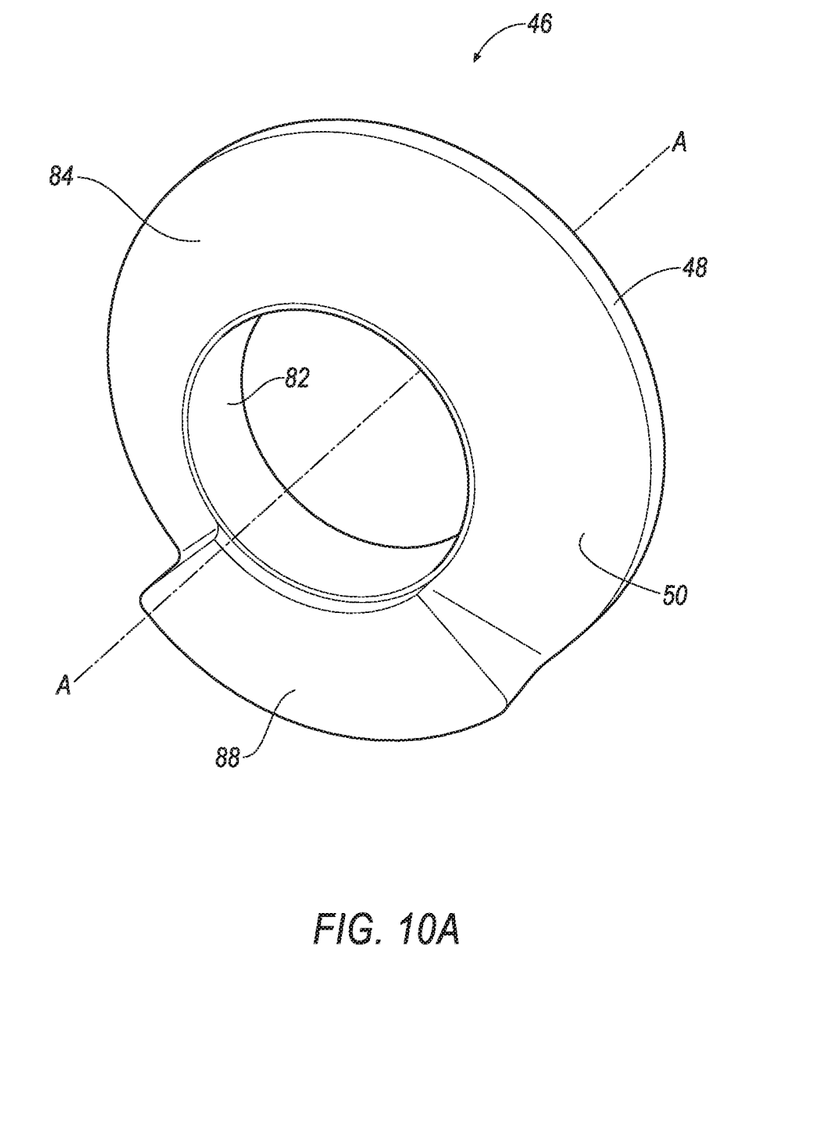
FIG. 10A is a perspective view of the disc.
Figure 10B:
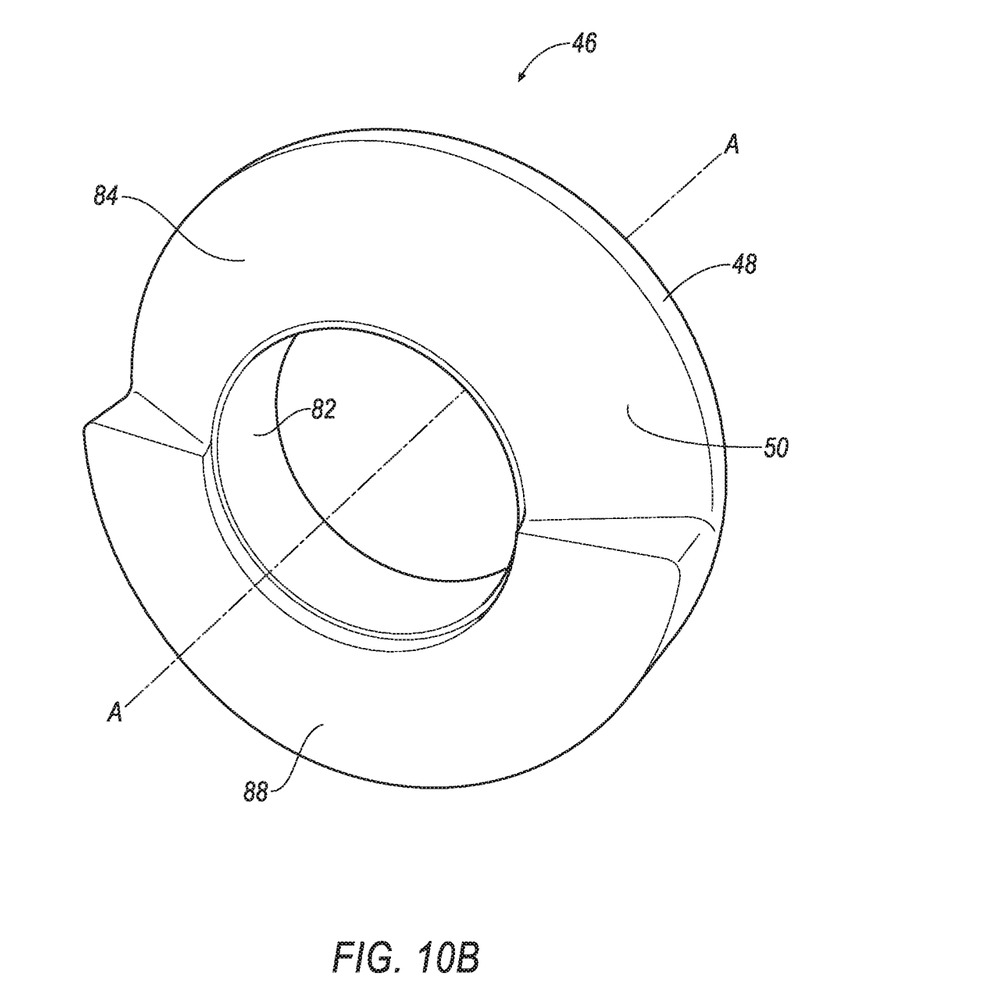
FIG. 10B is a perspective view of another example disc.
Figure 10C:
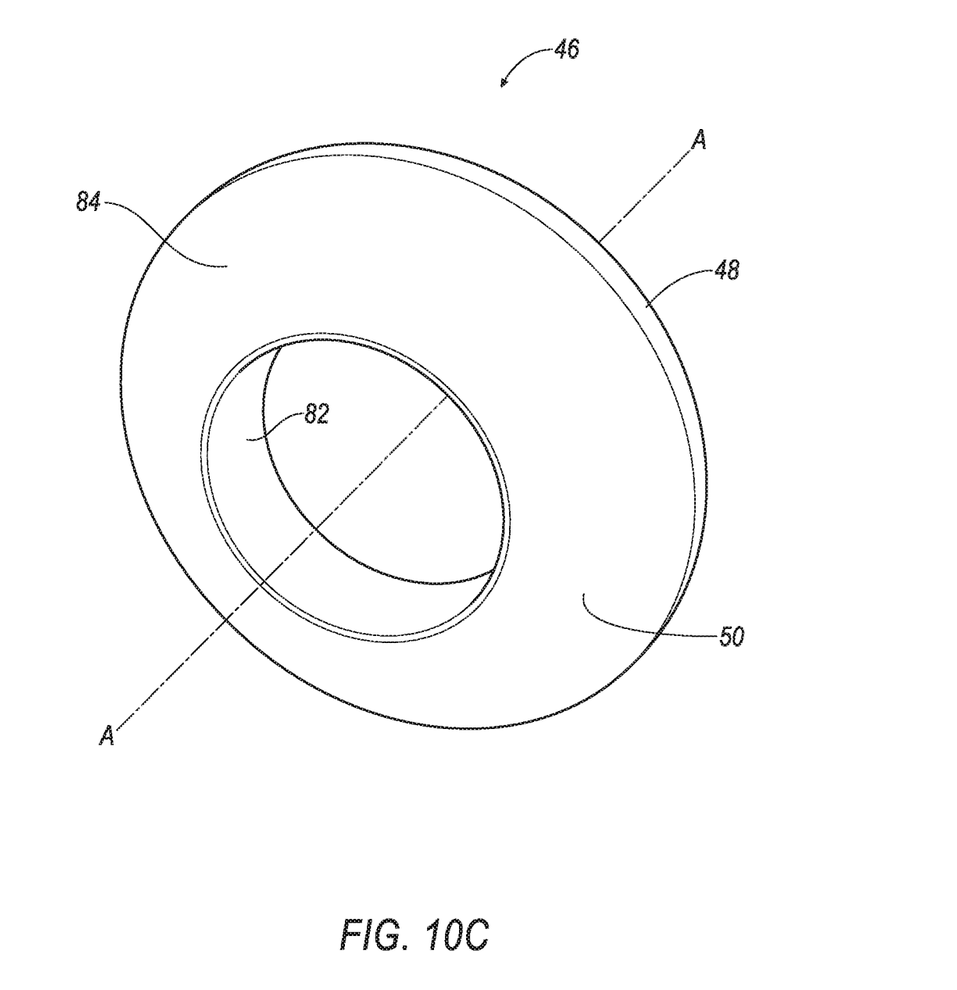
FIG. 10C is a perspective view of another example disc.

With reference to FIGS. 9-10C, the slot 50 is defined by the disc 46. The disc 46 is shaped to guide airflow from the first chamber 36, which has higher-than-atmospheric pressure, into an air curtain across the lens 44. The slot 50 is constituted by the panel 38, the front surface 84 of the disc 46, and possibly a projection 88 of the disc 46. The disc 46 may include the projection 88, as shown in FIGS. 10A and 10B, or may lack the projection 88, as shown in FIG. 10C. The projection 88 is shaped to block airflow from the chamber through the aperture 40 other than through the slot 50. The projection 88 contacts the panel 38, and the front surface 84 is spaced from the panel 38. The slot 50 and the projection 88 collectively extend 360° around the lens 44. The slot 50 extends at least 180°, as shown in FIGS. 10A-10C, around the lens 44, and the slot 50 may extend at least 270° around the lens 44, as shown in FIGS. 10A and 10C. The slot 50 may extend 360° around the lens 44, as shown in FIG. 10C, in which case the disc 46 lacks the projection 88. The slot 50 extends circumferentially around the axis A with the front surface 84. The slot 50 and the front surface 84 extend circumferentially from one end of the projection 88 to the other end of the projection 88, as shown in FIGS. 10A and 10B, or, if the disc 46 lacks the projection 88, 360°, as shown in FIG. 10C.

The front surface 84 extends along the slot 50. The front surface 84 faces toward the panel 38. The front surface 84 extends circumferentially around the axis A either from one end of the projection 88 to the other end of the projection 88 or 360°. The front surface 84 extends from the radially inner surface 82 to the radially outer edge 48. The front surface 84 slopes away from the panel 38 from the radially inner surface 82 to the radially outer edge 48. For example, the front surface 84 has a frustoconical or partially frustoconical shape around the axis A. The front surface 84 may have an angle measured from the axis A of approximately 45°.

Figure 11:
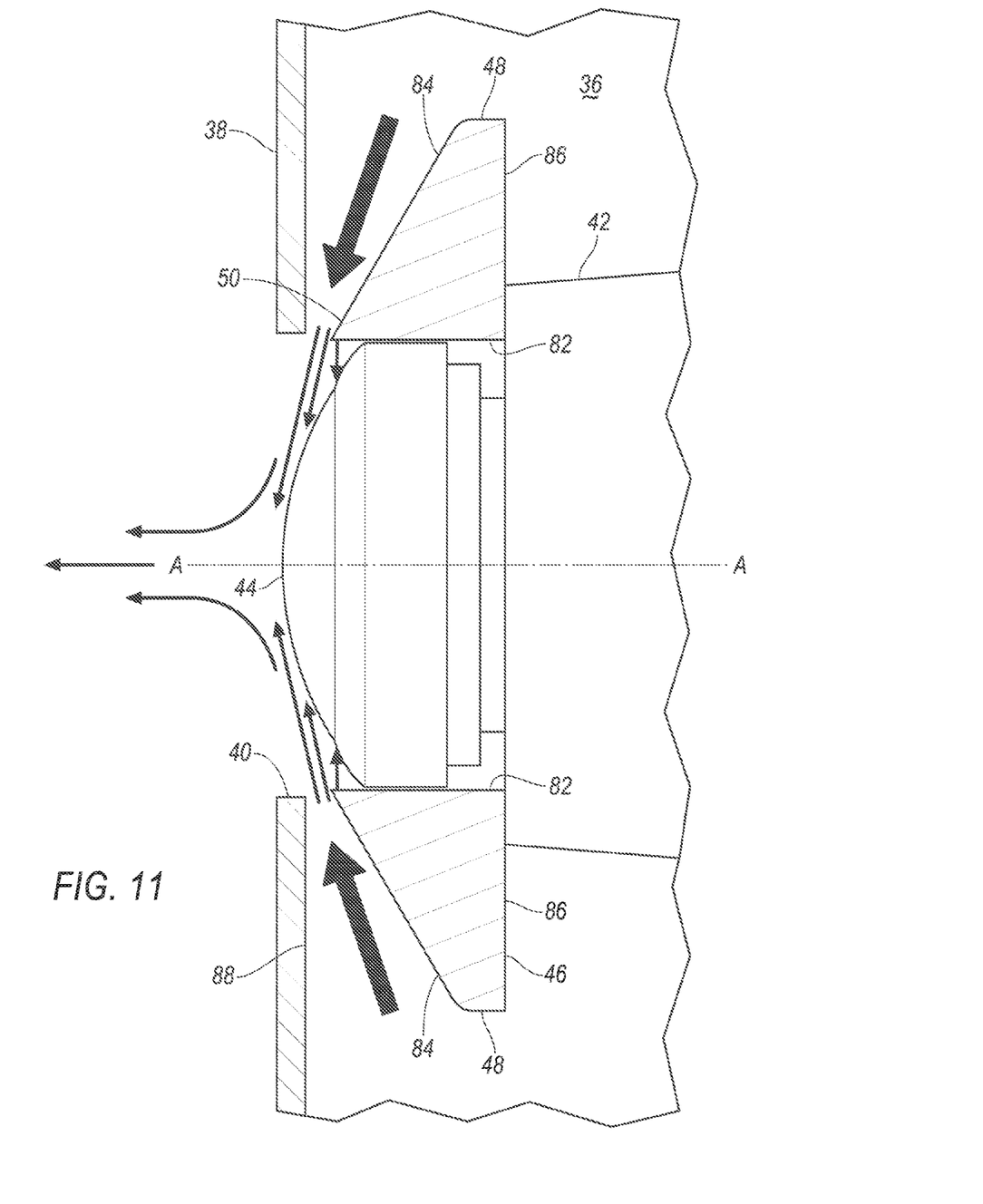
FIG. 11 is a cross-sectional top view of the sensor and disc inside the housing.

With reference to FIG. 11, in operation, the pressure source 74 draws in air from the ambient environment and directs the air to the first chamber 36. The pressure source 74 causes the pressure of the first chamber 36 to increase above the atmospheric pressure outside the housing 34. The increased pressure forces air through the slot 50. The shape of the slot 50 causes the airflow to form an air curtain across the lens 44 of the sensor 42. The air curtain can remove debris from the lens 44 as well as prevent debris from contacting the lens 44. Because the slot 50 extends at least 180° around the axis A, the air curtain comes together at a center of the lens 44 and forms an air stream projecting outward from the lens 44, allowing the debris-blocking benefits of the air curtain to occur farther from the lens 44. The autonomous operation of the vehicle 30 can be improved by having the sensors 42 with unobstructed fields of view.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An apparatus comprising:
   a housing defining a chamber and including a panel including an aperture;
   a sensor fixed inside the chamber and having a field of view through a lens and the aperture;
   an annular disc attached to the sensor concentrically around the lens and including a radially outer edge contactlessly exposed to the chamber, an annular slot defined by the disc, the slot extending at least 180° around the lens; and
   wherein the disc includes a radially inner surface at which the disc is attached to the sensor.

2. The apparatus of claim 1, wherein the slot extends at least 270° around the lens.

3. The apparatus of claim 2, wherein the slot extends 360° around the lens.

4. The apparatus of claim 1, wherein the disc includes a projection contacting the panel.

5. The apparatus of claim 4, wherein the slot and the projection collectively extend 360° around the lens.

6. The apparatus of claim 4, wherein the projection is shaped to block airflow from the chamber through the aperture other than through the slot.

7. The apparatus of claim 1, wherein the disc includes a front surface extending along the slot and facing toward the panel, and the front surface slopes away from the panel from the radially inner surface to the radially outer edge.

8. The apparatus of claim 1, wherein the disc includes a back surface facing away from the panel and extending from the radially inner surface to the radially outer edge, wherein the back surface is contactlessly exposed to the chamber.

9. The apparatus of claim 1, further comprising a pressure source positioned to raise a pressure of the chamber above an atmospheric pressure.

10. The apparatus of claim 9, wherein the pressure source is a blower.

11. The apparatus of claim 1, wherein the disc is shaped to guide airflow from the chamber into an air curtain across the lens.

12. The apparatus of claim 1, wherein the lens is convex.

13. The apparatus of claim 1, wherein the aperture is circular.

14. The apparatus of claim 1, wherein the panel has a cylindrical shape.

15. The apparatus of claim 1, wherein the sensor is a first sensor, the apparatus further comprising a second sensor fixed inside the chamber.

16. The apparatus of claim 15, wherein the aperture is a first aperture, the lens is a first lens, the panel includes a second aperture, and the second sensor includes a second lens defining a field of view oriented through the second aperture.

17. The apparatus of claim 16, wherein the disc is a first disc, the slot is a first slot, and the radially outer edge is a first radially outer edge, the apparatus further comprising an annular second disc attached to the second sensor concentrically around the second lens and including a second radially outer edge exposed to the chamber, an annular second slot defined by the second disc and the panel extending at least 180° around the lens.

18. An apparatus comprising:
   a housing defining a chamber and including a panel including an aperture;
   a sensor fixed inside the chamber and having a field of view through a lens and the aperture;
   an annular disc attached to the sensor concentrically around the lens and including a radially outer edge contactlessly exposed to the chamber, an annular slot defined by the disc, the slot extending at least 180° around the lens; and
   wherein the slot extends at least 270° around the lens.

19. An apparatus comprising:
   a housing defining a chamber and including a panel including an aperture;
   a sensor fixed inside the chamber and having a field of view through a lens and the aperture;
   an annular disc attached to the sensor concentrically around the lens and including a radially outer edge contactlessly exposed to the chamber, an annular slot defined by the disc, the slot extending at least 180° around the lens; and
   wherein the disc includes a projection contacting the panel.

20. The apparatus of claim 19, wherein the slot and the projection collectively extend 360° around the lens.

\* \* \* \* \*